(12) United States Patent
Wackerbauer et al.

(10) Patent No.: US 11,461,806 B2
(45) Date of Patent: Oct. 4, 2022

(54) UNIQUE AUDIO IDENTIFIER SYNCHRONIZATION SYSTEM

(71) Applicant: SonoBeacon GmbH, Wismar (DE)

(72) Inventors: Peter Wackerbauer, Pettendorf (DE); Hubertus Maschek, Bad Worishofen (DE); Thoralf Nehls, Jesteburg (DE)

(73) Assignee: SonoBeacon GmbH, Wismar (DE)

( * ) Notice: Subject to any disclaimer, the term of this patent is extended or adjusted under 35 U.S.C. 154(b) by 758 days.

(21) Appl. No.: 16/332,633

(22) PCT Filed: Sep. 12, 2016

(86) PCT No.: PCT/EP2016/001534
§ 371 (c)(1),
(2) Date: Mar. 12, 2019

(87) PCT Pub. No.: WO2018/046071
PCT Pub. Date: Mar. 15, 2018

(65) Prior Publication Data
US 2021/0295381 A1    Sep. 23, 2021

(51) Int. Cl.
*G06Q 30/00* (2012.01)
*G06Q 30/02* (2012.01)
(Continued)

(52) U.S. Cl.
CPC ......... *G06Q 30/0252* (2013.01); *G06F 3/167* (2013.01); *G10L 19/018* (2013.01)

(58) Field of Classification Search
None
See application file for complete search history.

(56) References Cited

U.S. PATENT DOCUMENTS

| 9,003,443 B2 * | 4/2015 | Green | H04N 21/2358 |
| | | | 725/36 |
| 9,973,374 B1 * | 5/2018 | Ratias | G06F 3/0481 |

(Continued)

FOREIGN PATENT DOCUMENTS

| JP | 2015201195 A | * 11/2015 | G06Q 10/10 |
| JP | 2015216679 A | * 12/2015 | G06F 1/12 |

(Continued)

OTHER PUBLICATIONS

Bright Hub. GooSync—a Free Utility to Synchronize Your Windows Mobile Device with Your Google Calendar. (Aug. 18, 2008). Retrieved online Nov. 8, 2021. https://www.brighthub.com/computing/windows-platform/articles/4773/ (Year: 2008).*

(Continued)

*Primary Examiner* — James A Reagan
(74) *Attorney, Agent, or Firm* — Fletcher Yoder, P.C.

(57) ABSTRACT

Methods and systems for dynamically providing content complementary to a content being rendered on mobile devices based on determining a context of the device based on identifying an encoded unique audio identifier. The transmission and playback of the complementary content is synchronized with the currently rendered content by dynamically taking into account the context of a user operating the mobile device. The context of a user may be built from considering a piece of currently rendered content, characteristics of a profile of a vendor, characteristics of the individual user and/or the user's individual profile, date, time of day and/or further additional information. The context may further take into account the current position and/or location of the user as acoustically triangulated based on sending and/or receiving unique audio identifiers as a high frequency audio signal.

14 Claims, 6 Drawing Sheets

(51) Int. Cl.
*G06F 3/16* (2006.01)
*G10L 19/018* (2013.01)

(56) References Cited

U.S. PATENT DOCUMENTS

| | | | | |
|---|---|---|---|---|
| 10,042,038 | B1* | 8/2018 | Lord | G10L 25/51 |
| 10,789,948 | B1* | 9/2020 | Klein | G10L 15/30 |
| 2006/0239503 | A1* | 10/2006 | Petrovic | G06T 1/0071 |
| | | | | 382/100 |
| 2010/0205628 | A1* | 8/2010 | Davis | H04N 21/4126 |
| | | | | 455/414.1 |
| 2011/0043652 | A1* | 2/2011 | King | G06F 40/194 |
| | | | | 348/222.1 |
| 2011/0143811 | A1* | 6/2011 | Rodriguez | G06K 9/228 |
| | | | | 455/556.1 |
| 2011/0275311 | A1* | 11/2011 | Buehler | H04H 60/58 |
| | | | | 455/3.06 |
| 2012/0214515 | A1* | 8/2012 | Davis | G10L 19/018 |
| | | | | 455/456.3 |
| 2013/0097190 | A1* | 4/2013 | Shah | H04N 21/2408 |
| | | | | 707/754 |
| 2013/0152139 | A1* | 6/2013 | Davis | H04N 21/8358 |
| | | | | 725/61 |
| 2014/0029768 | A1* | 1/2014 | Hong | G10L 19/018 |
| | | | | 381/119 |
| 2014/0222438 | A1* | 8/2014 | Courtney, III | G10L 19/018 |
| | | | | 704/500 |
| 2014/0327677 | A1* | 11/2014 | Walker | G06T 11/206 |
| | | | | 345/440 |
| 2015/0018014 | A1* | 1/2015 | Phan | G01P 13/00 |
| | | | | 455/456.3 |
| 2015/0046828 | A1* | 2/2015 | Desai | H04L 67/22 |
| | | | | 715/739 |
| 2015/0163206 | A1* | 6/2015 | McCarthy | G06F 21/6218 |
| | | | | 726/4 |
| 2015/0310188 | A1* | 10/2015 | Ford | G06F 21/10 |
| | | | | 726/28 |
| 2016/0104486 | A1* | 4/2016 | Penilla | G10L 15/005 |
| | | | | 704/232 |
| 2020/0034764 | A1* | 1/2020 | Panuganty | G06F 40/284 |

FOREIGN PATENT DOCUMENTS

| | | | | |
|---|---|---|---|---|
| KR | 20040062369 A | * | 7/2004 | H04N 21/233 |
| WO | WO-2009120583 A2 | * | 10/2009 | G06F 17/3002 |

OTHER PUBLICATIONS

Brent Butterworth. "The Power of Sync in Networked Consumer Audio." (Nov. 14, 2014). Retrieved online Feb. 19, 2022. https://avnu.org/wp-content/uploads/2014/05/The-Power-of-Sync-in-Networked-Consumer-Audio-Whitepaper.pdf (Year: 2014).*

Jason P. Davis. "Capturing the Value of Synchronized Innovation." (Jun. 18, 2013). Retrieved online Feb. 19, 2022. https://sloanreview.mit.edu/article/capturing-the-value-of-synchronized-innovation/ (Year: 2013).*

International Search Report for PCT/EP2016/001534 dated Jun. 7, 2017; 3 pages.

* cited by examiner

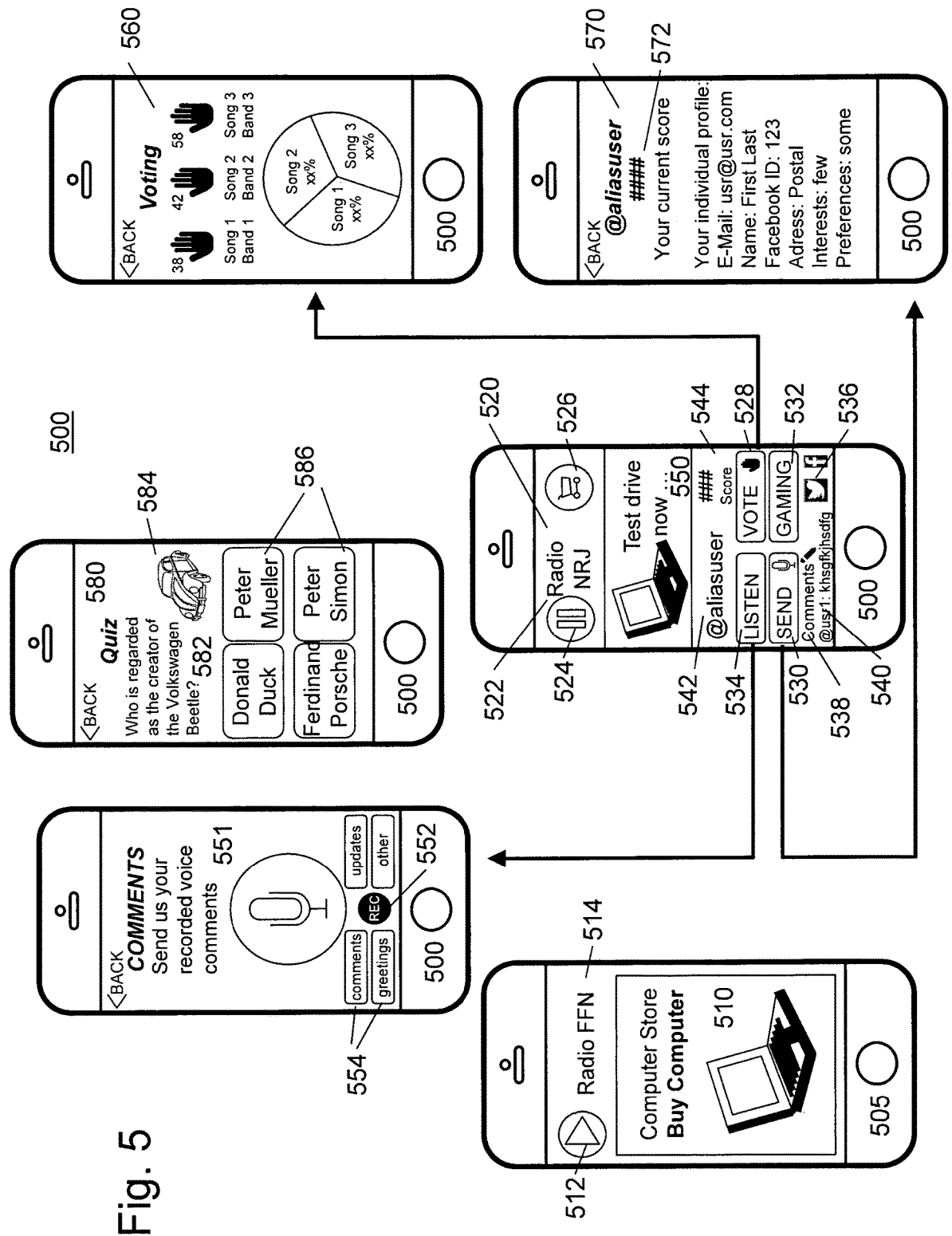

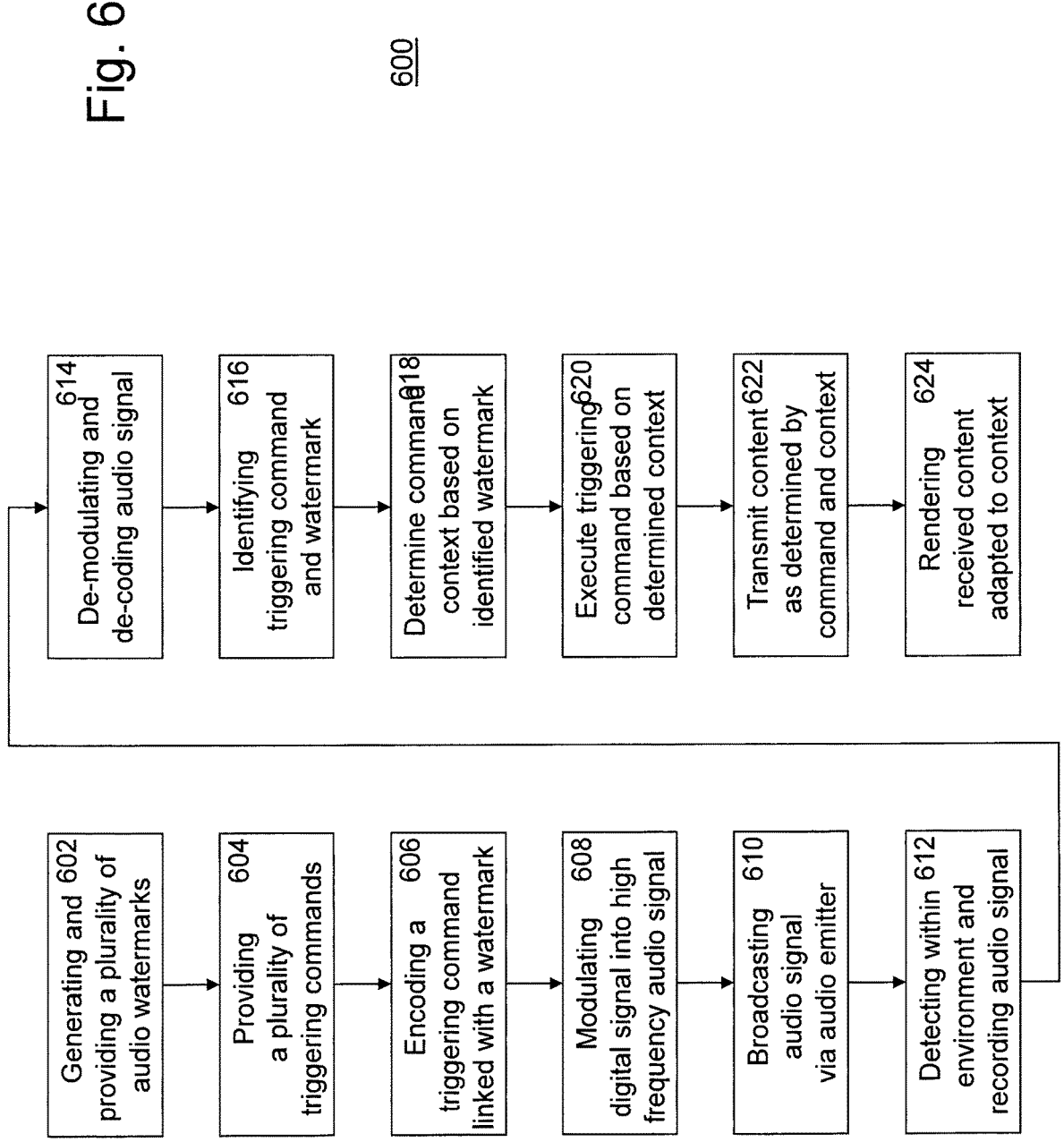

UNIQUE AUDIO IDENTIFIER SYNCHRONIZATION SYSTEM

CROSS-REFERENCE TO RELATED APPLICATIONS

This application is a national stage of PCT application no. PCT/EP2016/001534, entitled "UNIQUE AUDIO IDENTIFIER SYNCHRONIZATION SYSTEM", filed on Sep. 12, 2016, which is hereby incorporated by reference in their entirety.

TECHNICAL FIELD

The present disclosure relates to methods, techniques and systems for dynamically synchronizing devices with complementary content based on supplementing broadcasted content with unique audio identifiers.

BACKGROUND

Audio content may have traditionally been broadcasted via radio stations by radio frequency transmission over the air to radio receivers. However, in the course of digitalization of consumer electronics, more and more audio replaying end devices have been subject to technological change. Thus, typical audio replaying terminals today provide additional options for entertainment and functionality going beyond the mere receiving and replaying of an audio broadcast.

Such further options may relate to the playback of further sources of audio (CD, mp3, internet radio, streaming services . . . ) and/or video content (DVD, YouTube, internet video . . . ) as well as providing access to internet-based content sources (eBooks, audio/video streams . . . ) and executing of computer-readable instructions, i.e. Apps, application nor software programs.

Thus, audio playing terminals are more and more equipped not only with facilities to play back digital audio & video media but also with facilities to play back and display non-audio content like, for example, web pages and/or videos. For that, these terminals are equipped with digital displays. The audio content may further be enriched with complementing content, like e.g. pictures being transmitted in parallel to the audio broadcast and being displayed on the digital display of the corresponding terminal.

Based on the deficiencies of the state of the art, there is thus a need for improved methods and systems for dynamically synchronizing devices with complementary content based on supplementing audio broadcasting.

This object is solved by the subject matter of the independent claims. Preferred embodiments are defined by the dependent claims.

In the following a summary is provided to introduce a selection of representative concepts in a simplified form that are further described below in the detailed description. This summary is not intended to identify key features or essential features of the claimed subject matter, nor is it intended to be used in any way that would limit the scope of the appended claims.

Briefly, various aspects of the subject matter described herein are directed towards a technology by which content, e.g. audio and/or video is synchronized with a context of a mobile device by for example supplemented currently rendered with complementary content, e.g. still or moving images such that the transmission and playback of the complementary content (e.g. a video) is synchronized with a currently rendered content by dynamically taking into account the context of a user of mobile device. Based on that, techniques are provided that allow for providing dynamically synchronizing devices with complementary content based on supplementing broadcasted content with unique audio identifiers.

In an aspect of the present invention the current context of a user may be built from considering a unique audio identifier associated with a predefined context, characteristics of a profile of a vendor predefining the context, characteristics of the individual user and/or the user's individual profile (e.g. as retrieved from analyzing internet footprint, social media channel information, user activity history, a user's geo-/GPS-location and the like), date, time of day and/or further, i.e. alternative and/or additional information.

For that, in example implementations, a user profile is provided that comprises characteristics of a user that receives content on a mobile device such as, for example, an electronic or a mobile electronic device. The mobile electronic device may be a mobile telephone, a mobile radio device or a mobile music player, or any other electronic device being enabled to receive and playback audio broadcasting content. Moreover, in example implementations, the content may be received via over-the-air radio frequency transmission or may be received as a digital stream using web-based transmission techniques and/or any other digital or analog transmission and/or networking technique.

In example implementations, the content is received on a mobile device and rendered to the user via the mobile device. In example implementations, this rendering may be performed by playing back the content. The content may be provided and received as a sequence of tracks with a track representing a piece or sequence of content such as, for example, a song, a piece of editorial content, a news item, a radio spot or the like.

Based on the received sequence of audio broadcasting content, in example implementations, an audio broadcasting context is calculated by taking into account at least one of the current sequence of broadcasting content, e.g. the current track's profile and/or characteristics of the user of the mobile device and/or the profile and/or characteristics of the radio station broadcasting the current radio track . . . ), and/or characteristics of the user's profile (e.g. as retrieved from analyzing internet footprint, social media channel information, user history and the like), date, time of day and/or further, i.e. alternative and/or additional information.

For synchronizing supplementary content, in aspects of the present invention, a plurality of unique audio identifiers is provided wherein each identifier is associated with a predefined context. Further, a plurality of triggering commands is provided wherein at least one of the plurality of triggering commands is associated with at least one of the unique audio identifiers.

In aspects of the present invention, at least one triggering command is encoded together with the associated at least one unique audio identifier into a digital signal. On the resulting signal, modulation schemes are applied to generate a high-frequency audio signal to be broadcasted by an audio emitter. This high-frequency audio signal is received on a mobile device.

Based on the received audio signal, the context associated with the at least one unique audio identifier is determined based on decoding the received signal and dynamically recognizing the at least unique audio identifier in the currently broadcasted signal. Finally, in aspects of the present invention, the at least one triggering command as recognized from the decoded signal is executed, wherein the executing takes into account the determined context.

Thus, in aspects of the present invention unique audio identifiers or sound watermarks are used for establishing an audio channel via one or more audio emitters to convey a triggering signal or other digital information as a modulated high frequency sound signal or acoustic noise. Using acoustic noise or in other words an audio signal that is sent out from an audio emitter, e.g. a speaker or loud speaker at a high frequency enables to send or rather broadcast the respective information or signal such that the sent-out modulated noise or sound signal is not perceptible to the average human ear.

In aspects of the present invention, the transmission of the modulated sound signal or acoustic noise is done with a speaker of an audio emitter. Thus, in aspects of the present invention, an audio emitter transmits or broadcasts a high frequency acoustic noise carrying an information or digital signal. This acoustic signal, broadcasted or transmitted by a speaker of an audio emitter is detected by a microphone of an audio receiver that receives the broadcasted or transmitted audio signal for further processing. The resultant audio signal is detected by the receiver, de-modulated, decoded and by that, at the receiver's end the original information or digital signal is made available for further processing or execution.

For this, in aspects of the present invention the information or digital signal or triggering command is encoded, e.g. with an error correction method or coding scheme and then modulated by a combination of frequency shift keying (FSK) and amplitude shift keying (ASK). In example implementations, quadrature amplitude modulation (QAM) maybe used which conveys message signals by modulating the amplitudes of two carrier waves using amplitude-shift keying (ASK) and/or frequency shift keying (FSK). These two carrier waves of the same frequency are out of phase by 90°. The modulated waves are then summed and the resulting signal is a combination of phase-shift keying (PSK) and amplitude-shift keying (ASK). For this modulation, in aspects of the present invention a frequency range is selected that is non-audible for an average human ear. Alternatively however, also frequency range may be selected that is indeed audible for humans.

In aspects of the present invention, this modulated signal is transmitted or conveyed, i.e. broadcasted via a loud speaker, e.g. a speaker of an audio emitter, so that an audio receiver, e.g. a mobile phone can receive or detect the signal within a predefined range, e.g. up to 10 meters, wherein this range maybe selectable bayed on the signal strength or the broadcasted or transmitted audio signal or acoustic noise, i.e. the volume of the noise or acoustic signal.

In aspects of the present invention, the audio receiver receives the transmitted or broadcasted audio signal with a microphone. In aspect of the present invention, in response to detecting the transmitted signal, the audio receiver may record the broadcasted signal. Then, in aspects of the present invention the receiver may proceed with demodulating the received and/or recorded acoustic noise. Further on, in aspects of the present invention the receiver may subsequently carry out the decoding of the demodulated signal based on the originally applied error correction method or coding scheme. Depending on the thereby obtained, decoded information or triggering command, the receiver continues executing corresponding further steps as determined or predefined by the original information or digital signal (for example, requesting and subsequently rendering context-sensitive supplementary content, coupons etc.).

In example implementations, a user profile is provided comprising characteristics of at least one of a plurality of users, the one user operating the mobile device. In aspects of the present invention, the context further is determined, amongst others, based on identifying characteristics of that user's profile.

In example implementations, complementary content items are created and stored. For these complementary content items, mappings are created mapping each complementary content item to at least one context by associating one or more unique audio identifiers with one or more complementary content items. In aspects of the present invention, these the mappings are stored in one or more catalogues enabling a look-up search for matching complementary content.

In some implementations, while executing the decoded triggering command, the one or more catalogues are searched for identifying at least one complementary content item based on the determined context. In aspects of the present invention, a matching complementary content item is herein determined, subsequently requested by e.g. the mobile device and in response and sent to the mobile device for rendering to the user.

In example implementations, the matched complementary content is received on the mobile device and rendered such that the complementary content is rendered in parallel to the rendering of the currently being rendered content such that the complementary content is dynamically synchronized to the currently rendered content.

In aspects of the present invention, determining a context is based on identifying characteristics associated with the at least one unique audio identifier and/or a location of the audio emitter. Further aspects relate to determining a context additionally by taking into account a weighted consideration of at least one of a characteristic of a content currently being rendered on the mobile device, information retrieved from the user's profile, information retrieved from a vendor's profile, a current day and/or time.

Determining an individual context of a user maybe performed by an application service of an unique audio identifier synchronization service or maybe performed additionally or alternatively by an application processing on an end device that holds a user's profile, characteristics of a user's history of activity, features of a user's current geo-context and the like without exchanging this data with an application service outside of the control of the user operating the end device to account for privacy and data protection considerations.

In aspect of the present invention, a complementary content item may be a visual content, an image, a movie, a video, like e.g. a visual advertisement complementing an broadcasted content and/or application functionality to be rendered at user device. In some implementations, a complementary content item is provided as application functionality, the complementary content item being transmitted to the device and rendered on the device to enable the user to engage in interactive activities, the interactive activities being at least one of voting, commenting, buying, and/or recording a personal message and sending the personal message to a vendor. In some implementations, the user's activity on the transmitted application functionality is tracked and stored as a user's historic activity profile, wherein the user's historic activity profile is a part of the data being stored in the user's profile on the mobile device.

In some implementations, the context may be further determined by acoustically triangulating the position of the mobile device. In further aspects, the mobile device may itself perform as an audio emitter broadcasting back at least one encoded and modulated high frequency signal to at least one audio emitter. In example implementations, this acting of the mobile device as an audio emitter may be performed by the mobile device using its build in signal tone capabilities (e.g. ring tones generator and the like) to send or rather broadcast a modulated signal generated from a triggering command and a unique audio identifier. Thus, in example implementations e.g. the ring tone of a mobile device may contain and convey a watermarked audio signal, the ring tone thereby providing an audio channel to convey a triggering signal or other digital information as a modulated sound signal or acoustic noise.

In further aspects, a computer-readable medium is provided that has thereon computer-readable instructions that, when run on a computer, are configured for performing the steps of any of the above described methods. In addition, a computer-implemented system is provided for providing dynamically synchronizing devices with complementary content based on supplementing broadcasted content with unique audio identifiers. In aspects of the present invention, the system comprises means configured for providing a plurality of unique audio identifiers, wherein each identifier is associated with a predefined context and means configured for providing a plurality of triggering commands, each of the plurality of triggering commands being associated with at least one of the unique audio identifiers. In aspects of the present invention, the system further comprises means configured for encoding at least one triggering command associated with at least one unique audio identifier into a digital signal and applying modulation schemes on the resulting signal to generate a high-frequency audio signal to be broadcasted by an audio emitter. In further aspects, the system may comprise means configured for receiving, on a mobile device the broadcasted audio signal, determining in response to the receiving the context associated with the at least one unique audio identifier based on decoding the received signal and dynamically recognizing the at least unique audio identifier in the currently broadcasted signal. Finally, in some implementations, the system may comprise means for executing the at least one triggering command as recognized from the decoded signal, wherein the executing takes into account the determined context.

Other advantages may become apparent from the following detailed description when taken in conjunction with the drawings.

BRIEF DESCRIPTION OF THE DRAWINGS

FIG. 5 schematically illustrates a mobile device that may be an example implementation of a mobile device as used in a unique audio identifier synchronization system.

FIG. 6 schematically shows an example sequence of dynamic audio identifier synchronization for providing context-sensitive, complementary content for a mobile device.

DETAILED DESCRIPTION

Embodiments described herein provide computer and network-based methods, techniques and systems for dynamically synchronizing devices with complementary content based on supplementing audio broadcasting with unique audio identifiers.

Figure 1:
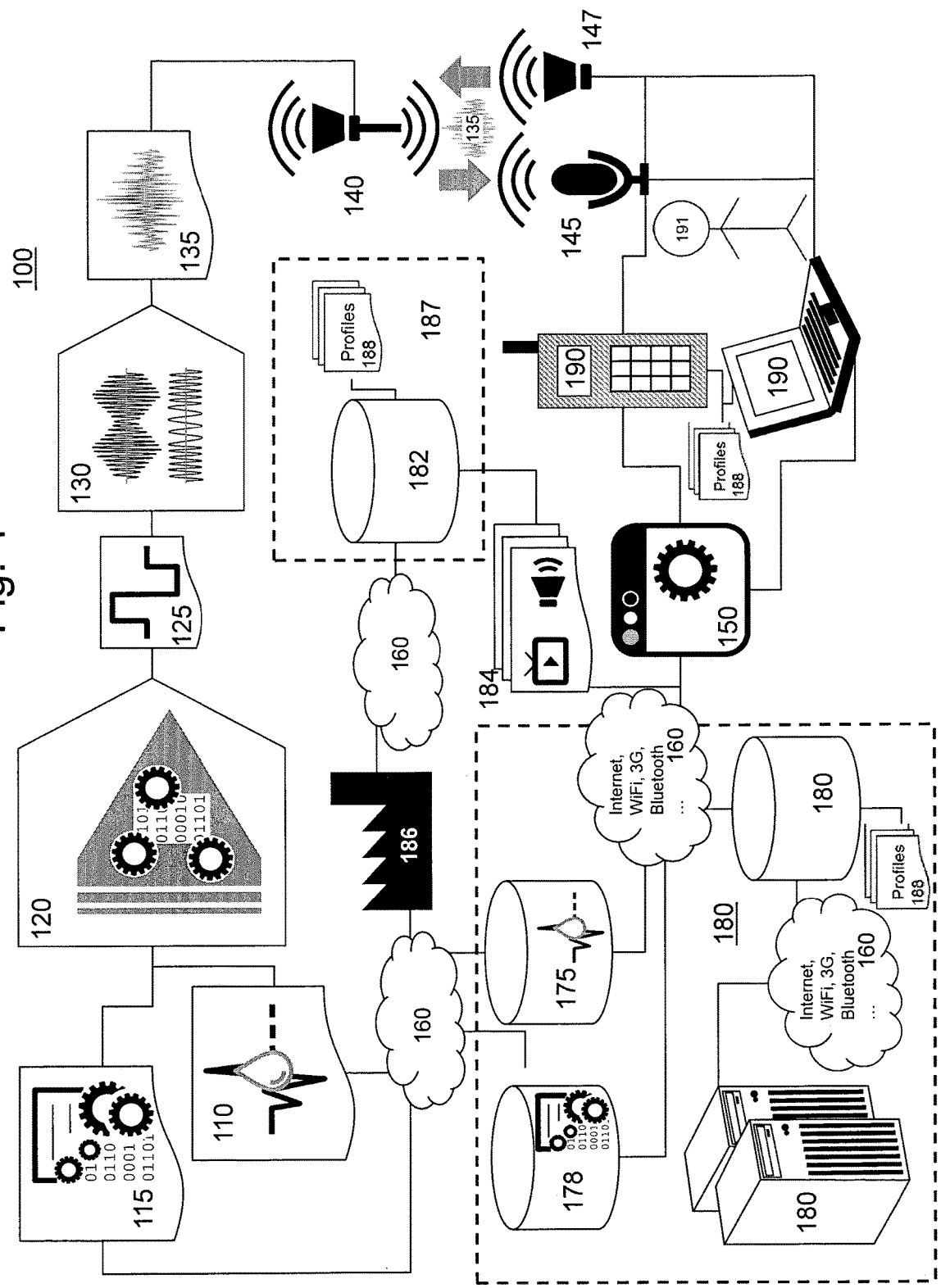
FIG. 1 schematically shows a simplified illustration of an example implementation of unique audio identifier synchronization system.

FIG. 1 schematically shows an example implementation of unique audio identifier synchronization system 100. This simplified illustration of system 100 shows the unique audio identifier or audio watermark 110 and the triggering signal 115, which are both encoded using an error correcting coding 120. The resulting digital signal 125 is configured to trigger audio terminals or computing devices 190 in a context sensitive way, this context being provided based on the watermark or unique audio identifier 110 being part of encoded signal 125. Using encoding 120 in the form of error correction encoding 120 however, may serve only as an illustrative example for encoding 120 a unique audio identifier 110 and a triggering signal 110 together into one resulting digital or analog signal 125. In other implementation, further, alternative of additional coding techniques 120 may be used to generate signal 125 based on encoding acoustic watermark 110 and triggering command 115.

In example implementations, unique audio identifier 110 is generated in a pre-broadcasting phase as an individual acoustic fingerprint 110 by an audio synchronization service provider 180 or may be created on the fly by a device 190 during broadcasting of audio content 184 to audio terminal 190. Audio terminal 190 may be a computer, a Laptop, a cell phone and/or a smart phone or any other mobile or stationary device being able to receive and playback received audio and/or video content. However, these types of devices rather serve as illustrative examples. And thus, in some implementations, additional and/or alternative types of computer-enabled devices 190 may be used within the context of system 100.

Unique audio identifier or audio watermark 110 may identify a context based on for example a device or type of device, a location or any other type of context. Such unique audio identifier 110 may be provided by a watermark provider 180 and/or maybe created using an algorithm 150 or application 150 provided by provider 180 on for a computer-enabled device 190, for example mobile device 190.

In example implementations, for each watermark 110 a unique, reproducible hash tokens is extracted from data and/or information provided by an advertiser 186 and/or a user of device 190 that intends to make use of the subsequently generated unique identifier 110. Using these identifiers 110, a complementary content catalog 184 is built by a complementary content provider 183 and/or an audio synchronization service provider 180 and stored in databases 182. In some implementations, this database may be operated by a complementary content provider 183, as depicted in FIG. 1, and/or alternatively or additionally be operated by audio synchronization service provider 180.

This database of complementary content is associated with an indexed list of the reproducible hash tokens. This indexed list, the unique audio identifier database 175, allows for searching and identifying any acoustic watermark 110 such that the context of that watermark can be determined based on the meta-data stored in acoustic identifier database 175.

In example implementations, a decoded unique audio identifier 110 is looked up using audio watermark database 175 which provides the context associated to the identified watermark 110. Based on that determined context associated with decoded watermark 110, complementary content item catalog 182 may be searched, using the decoded acoustic unique identifier (AUID) and the associated context, for mapping an entry in complementary content item catalog 182 to that determined context. In example implementations, application 150 operating on mobile devices 190 may be notified via data link 160 and triggered to pull the respective complementary content item(s) 184 relating to the mapped entry from complementary content provider 182 for blended replay on end device 190.

Thus, in example implementations, complementary audio and/or video content 184 may be received by and/or pulled by a mobile application 150 operating on mobile device 190 after notification from an audio synchronization service provider 180 that a match has been determined for an unique audio identifier 110, as previously detected by device 190 and conveyed via data link 160 to service provider 180, in database 175.

For enabling device 190 to detect watermark 110 using acoustic means, encoded digital signal 125 is modulated into a high frequency audio signal 135 using modulation schemes 130, for example amplitude shift keying (ASK), amplitude modulation 130, frequency shift keying (FSK), frequency modulation and/or quadrature amplitude modulation (QAM). These modulation schemes, however, only serve as examples of modulation schemes 130. More particularly, alternative and/or additional modulation schemes, for example further digital modulation schemes 130, may be used for generating the high frequency audio signal 135 from the encoded signal 125. In some example implementations, in particular a combination of several of these modulation schemes 130 may apply, for example a combination of frequency shift keying (FSK) and amplitude shift keying (ASK).

In example implementations, digital signal 125 is modulated using modulation schemes 130 such that for generating audio signal 135 a high range of audio frequencies may be chosen such that the high frequency audio signal 135 may not noticeable by the human ear due to its frequency and/or volume level. Alternatively or additionally, a frequency range may be chosen that is indeed noticeable by the human ear. Audio signal 135 may in some example implementations be play backed as a single audio signal 135, i,e, standalone. In some example implementations, this signal 135 may also be overlaid to some basic acoustic signal, e.g. background music, audio broadcast or the like.

Such audio signal 135, watermarked by unique audio identifier 110 in some example implementations may thus overlay a general audio broadcast, e.g. background music being played in a mall or supermarket via public speakers. For example, a signal 135 may be replayed by a broadcasting source 140 at the beginning of broadcasting an advertising spot. This allows for a substantially instant identifying of the context, the context in this example implementation being the broadcasted advertising, based on matching the detected audio watermark 110 to the respective catalog 175. Additionally or alternatively, watermarked audio signal 135 may be replayed as a standalone acoustic noise 135 not noticeable by the human's ear due to its frequency/volume level.

This modulated and watermarked audio signal 135 is broadcasted via audio emitter 140, i.e. the modulated high frequency audio signal 135 is played back by audio emitter, e.g. speaker 140 to be broadcasted into its surrounding environment. In example implementations, this surrounding environment of speaker 140 may encompass a range of 5 to 7 meters, in some example implementations this range may be up to 10 meters. The range of that environment may in some implementations be tuned by the frequency of signal 135 as being modulated by schemes 130 and/or the volume at which audio transmitter 140 replays watermarked audio signal 135 into its surrounding environment. In some example implementations, this range of the surrounding environment may be tuned to be very small in order to ensure, that signal 135 may only be detectable and decipherable if respective devices 190 a very close to audio emitter 140. In other, alternative or additional implementations, frequency and volume may be tuned such that signal 135 is detectable and decipherable in a preferably large range up to the maximum of the technique disclosed herewith in order to address also far away devices 190.

Within this surrounding environment, microphone 145 of an audio terminal 190 may be able to detect or notice the modulated audio signal 135 which may be broadcasted by audio transmitter 140 by itself as a standalone stream of audio or which may be broadcasted as a modulated and watermarked audio signal 135 overlaying an underlying noticeable stream of audio, for example background music conveyed by speaker 140. Microphone 145 however just serves an illustrative example of an audio receiving and/or audio detecting arrangement. In further example implementations, device 190 may use several microphones, independently from each other and/or coordinated as an array of microphones in order to monitor the acoustic environment of device 190 as triggered by application 150 to notice and/or detect any signal 135.

Microphone 145 thus notices modulated signal 135 and triggers application 150 implemented and running on audio terminal 190 in response to this noticing of signal 135. Audio terminal 190 may be a computing device, for example a computer or a laptop, but may alternatively also be a cell phone and/or a smart phone, or any other electronic device that is capable of detecting audio signals 135 via one or more or an array of independent or coordinated microphones 145 and executing an application 150 to decode signal 135 as recorded via microphone 145. These types of devices however only serve as illustrative examples and in other implementations alternative types of devices may be used to implement system 100.

In example implementations, application 150 has been installed on device 190 and is executed on device 190 in a background fashion. Alternatively, application 150 may also run in a foreground fashion as an active application. Application 150 provides code to be executed on device 190 such that microphone 145 of device 190 latently receives audio from the environment surrounding device 190. Thus, application 150 configures device 190 to analyze the audio received via microphone 145 and analyzes this received audio in order to detect and identify any modulated signal 135 carried within the received audio from the device's 190 environment.

Thus, in example implementations, microphone 145 of device 190 monitors the acoustic environment and thereby latently listens to audio in the surrounding environment of device 190. Any broadcasted high frequency signal 135 is thereby detected and recorded by device 190 such that application 150 running on device 190 can demodulate the recorded high frequency audio signal 135 to reproduce the signal 125 previously generated by encoding 120. After having demodulated audio signal 135 to receive digital signal 125, application 150 and/or device 190 decodes signal 125 using decoding schemes that match the initially applied coding schemes 120, e.g. error correcting coding 120 that was initially applied to create digital signal 125.

After this decoding of, e.g. error correcting de-coding 120 of demodulated signal 125, application 150 derives the originally encoded unique audio identifier 110 together with the triggering signal 115. Via network connection 160, for example mobile data, internet or any other voice or data network, device 190 conveys the demodulated and de-coded audio watermark 110 and/or triggering signal 115 to synchronization service provider 180. Such audio watermark 110 may be a digitally transmitted to using any digital network transmission means 160 like, for example, wireless or wireline internet connections. Alternatively or additionally analogue radio frequency signal transmission over the air maybe used as a traditional over-the-air radio frequency network. Alternatively, a wireless or wireline digital or analog network may be used working along the standards of the Internet protocol or any other suitable network protocol. This types of network and/or data link connection 160 however only serve as illustrative example. Thus, in implementations of system 100 other, in particular alternative and/or additional form and techniques for digital and/or analog transmitting of identifiers 110 and/or triggering signal I115 to service provider 182 may be implemented.

Having received watermark 110 and/or triggering signal I115 from device 190, audio synchronization system 180 accesses database 175 to identify the received watermark 110. In example implementations, database 175 provides look-up tables that associate unique audio identifiers 110 to contexts of audio emitters 140. Similarly, database 178 provides look-up tables for triggering signals 115 that associate any triggering signal 115 to an operation to be executed either by synchronization service provider 180, complementary content provider 182, application 150 and/or device 190. However, watermark database 175 as well as triggering signal or command database 178 only serve as illustrative examples. More particularly, in some implementations, any these databases 175/178 may be one database, and/or may be split into several databases, or may be a distributed system accessible for device 190 via cloud interfaces. Moreover, in some implementations, unique audio identifier database 175 and/or triggering signal database 178 may also be part of application 150 and/or otherwise implemented on device 190.

In either of these implementations, device 190 is provided direct or indirect access to database 175 and database 178 each of which providing capabilities for search their content to identify matches of the decoded unique audio identifier 110 with the unique audio identifiers 110 previously stored in database 175. Similarly, device 190 has access to triggering signal database 178 which provides capabilities for searching the received decoded triggering signal 115 in the contents of database 178 in order to identify a match with triggering signals 115 previously stored in database 178. In some implementations however, triggering signal 115 may also be directly interpretable and/or executable by device 190 and/or application 150. In these example implementations, device 190 and/or application 150 may not convey the de-modulated and de-coded triggering signal 115 to audio synchronization system 180 in order to identify this signal in database 178. Instead, only watermark 110 may be conveyed and/or analyzed on device 190 and in response to the context information derived from the de-modulated and de-coded watermark 110 and e.g. received from synchronization service provider 180 at device 190, such device 190 may be enabled to directly execute triggering command 115 at device 190 in a context-sensitive fashion without prior looking up in database 178.

Based on watermark 110 being identified in database 175, audio emitter 140 and further elements of the current context of device 190 may be identified and derived from the meta-information and/or user profiles 188 stored in databases 180 and/or database 175. In example implementations, this identification may lead to conveying information to application 150 and/or device 190 that provide a context relating to audio emitter 140, for example relating to the exact location of audio emitter 140, relating to the owner and/or operator of audio emitter 140 and/or referring to further information that relates to audio emitter 140 like e.g. vendor 186 making use of speaker 140 e.g. in a mall to broadcast information communication to the public.

Similarly, in example implementation the identifying of the triggering signal 150 in database 178 may lead to identifying on or more operations that is intended to be triggered by the identified triggering signal 115. For example, triggering signal 115 may trigger conveying of context sensitive content from synchronization service provider 180 to device 190 and/or application 150 in order to be replayed and rendered at device 190. Such context sensitive content 184 may, for example, be context sensitive in relation to the context of the identified audio emitter 140, the context of device 190 and/or user 191 and or both. Thus, in example implementations, the same triggering signal 115 encoded together with different watermarks 110 may lead to a similar or same operation being triggered, e.g. conveying context sensitive content 184 to device 190 and/or application 150 but based on the watermarks 110 being different and relating to the respective different contexts identified by said watermarks 110, different context sensitive content 184 may be conveyed to be displayed at devices 190.

In example implementations, synchronization service provider 180 takes into account further information in order to identify a context for device 190. For that, in example implementations, any user 191 of device 190 equipped with application 150, e.g., may be provided with a user profile 188 at synchronization service provider 180 and/or complementary content provider 182. Alternatively, such user profiles 188 holding further data like characteristics of a user's 191 history of activity, features of a user's 191 current and/or past geo-context and the like may in example implementations not be exchanged with a complementary content provider 182 but instead be held on the end device 190 to account for privacy and data protection considerations.

These user profiles 188 may store meta information on an individual user 191, for example, characteristics with regard to preferences in listening and/or viewing behavior, buying behavior and the like. Moreover, such user profiles 188 may be enriched with demographic information on users 191 and/or further information retrieved from historic activity of users 191 e.g. while interacting with application 150 in processes of voting, buying, greeting, commenting and the like and/or social channel activity of a user 191 of mobile device 190. Moreover, this information may have dynamic character by taking into account time and location, e.g. location as determined using GPS or alternatively or additionally as determined using acoustic triangulation, based considerations for identifying patterns of user 191 behavior and preferences depending on the time of day, the date, the user's 191 GPS location and/or user's 191 location as determined by acoustic triangulation and the like.

Using this information 188 on a user 191, a personalized and dynamic user profile 188 may be generated that allows for individually targeting complementary content items 184 taking into account the characteristics and/or communicative aims of a vendor or advertiser 186, characteristics of the current context of a user 191 and or device 190, and additionally taking into account the dynamic characteristics of the individual user's 191 profile 188 stored either at complementary content provider 182, audio synchronization provider 180, and/or end device 190. The mentioned elements of an individual, personalized user profile 188, however, are solely of illustrative and exemplary character and thus in several implementations of the system 100, further, additional or alternative elements and characteristics may be stored in such user profiles 188.

In example implementations, the individual user's profile 188 may thus be stored and kept on the respective end device 190. Using these profiles 188, the unique audio identifier synchronization system 100 may provide a service access point per target group for user targeted advertising. For that, user profile data may be collected on end device 190 in profile catalogue 188. Utilizing this user profile catalogue data, an user target group ID may be compiled on device 190 in profile catalogue 188. This compilation may in example implementation be fully executed and computed on end device 190 without any sending of profile data 188 to any data center 180/182 or any other third party 180/182. Thus, privacy considerations are fully respected and any user's 191 privacy is ensured.

In example implementations, audio synchronization service provider 180 may create service access point mappings that associate a service access point to a respective target group ID. Such service access point mappings may be send to end devices 190. Utilizing received service access point mappings, end device 190 may update its locally stored service access point catalogue with received service access point mappings. Such updated service access point catalogue may be utilized by end device 190 to look up a matching service access point for user's 191 target group by identifying the user's target group ID within the service access point catalogue.

Thereby, the device 190 and/or application on150 executing on device 191 may be enabled to request complementary content 184 from the identified service access point of the user's 191 respective target group. In example implementations, not only dynamic characteristics of the individual user's 191 profile 188 but also characteristics of the vendor or advertiser 186 may be taken into account. As with individual user 191, also with vendor or advertiser 186 a vendor and/or advertiser profile 188 may be stored in database 188, at content provider 182 and/or at end device 190. Such vendor profiles 188 may take into account characteristics of the specific target groups of a particular vendor 186 at specific dates or times as for example with regard to activity, listening, buying and/or other preferences of users 191. Moreover, such profiles 188 may store information and preferences of customers of vendor 186, for example, regarding the urge and willingness to consume content 184 via device 190.

Thus, audio synchronization service provider 100 may at any point in time calculate a context of a user 191 and/or a device 191 taking into account one or more of a dynamic individual user's 191 profile 188, and/or the characteristics of vendor profile 188 of vendor 186 and the current audio context of device 190 and/or user 191 as rendered by detected audio watermark 110. Besides information from the user profile 188, vendor profile 188, and audio context as indicated by watermark 110, additionally information like the time of day, the specific day or dates, the GPS location and/or the acoustically triangulated position of the device 190, the surrounding environment in which device 190 is currently operated in and the like may be taken into account.

However, these additional pieces of information rather serve as illustrative and exemplary examples of such additional pieces of information that may be taken into account when calculating an individual and dynamic audio context. In other implementations additional and/or alternative pieces of information may be used to calculate a context for user 191 and/or device 190. The calculated context dynamically characterizes the context of the situation and/or location and/or position of user 191 at any given point in time.

Accordingly, in example implementations, unique audio identifier synchronization service provider 182 operates to match complementary content items in a context sensitive and dynamic way such that an individual and dynamically personalized selection or rather targeting of complementary content items 184 may be achieved for an individual user 191 from a complementary content items catalog 182 at any given point in time.

In example implementations, this dynamic targeting may be employed for broadcasting context-sensitive and individually targeted advertisements 184 from complementary content provider 182 to user 191 that may be replayed on a device 190. For example, while walking by an advertising bill board equipped with audio emitters 140 of unique audio synchronization system 100 featuring a foreign country, e.g New Zealand, using the dynamic and individual targeting, the user 191 may be presented with an offer to buy a holiday journey to New Zealand via application on150 on device 190. This offer may be presented to the user as a complementary video content item 184 and may additionally enable the user via respective application functionality to engage in instantly buying that journey or being transferred to the respective vendor 186 of the journey. Thus, context sensitive advertisement 184 may be created that is presented to the user on e.g. via a screen of a device 190 that thereby complements a stationary installations like e.g. bill boards by blending in context sensitive content 184.

Such context sensitive advertisement 184 may be further individualized to target single individual users 191 in their individual dynamic contexts. Such individual targeting may as individual context take further into account characteristics of the current environment surrounding user 191 and/or device 190, profile characteristics of context-relevant vendors 186, the individual and dynamic user profile 188 enriched with history data on the user's 191 interaction with application 50 (e.g. user's 191 geo-data as detected by device's 190 GPS sensor, acoustically triangulated position of user 191 and/or device 190, preferences when voting, activities in gaming and the like). Such history data recorded based on the activities and behavior of an individual user 191 may thus enable a behavior-based, individual and dynamic targeting of advertising content 184 provided by synchronization service provider 180 and/or complementary content provider 182 to user 191.

Determining that individual and dynamic audio context of a current user 191 may be performed by the application service 182 of unique audio identifier synchronization system 180 or maybe performed additionally or alternatively by the application 150 processing on end device 190 that holds a user's profile 188, characteristics of a user's history of activity 188, features of a user's current geo-context, acoustically triangulated positioning and the like without exchanging this data with the application service of synchronization service provider 182 to maintain control of the user 191 via the end device 190 and account for privacy and data protection considerations. Accordingly, device 190 with application 150 creates and renders a seamlessly merged audio/video content playback featuring complementary content items 184 such that this merged playback of content with complementary content item 184 may in example implementations be individually and dynamically targeted and unique for the individual user 191 at a specific point in time, thus being different for a different user 191 that may have different characteristics in his or her user profile 188.

In example implementations, thereby "classic" mass communication via bill boards, radio, back ground broadcasting, radio ad/or TV spots may be supplemented with complementary content items 184 targeted for being rendered on mobile device 190. Thereby, for example, audio and visually synchronized advertisements 184 can be created that are context-sensitively targeted to individual users 191 and/or user target clusters. This generates personalized and higher value communication as well as additional advertisement opportunities for marketers.

However, triggering signal 115 may also trigger application 150 and/or device 190 to execute an operation, for example emitting a specific sound, emitting a specific light signal and/or replaying an audio or video file stored on device 190. These operations, however, only serve as illustrative examples, and thus triggering signal 115 may trigger a variety of different and/or additional operations. Moreover, triggering signal 115 may also trigger a combination of different operations to be executed, for example the conveying of context sensitive content from synchronization service provider 180 or any other external content provider 182 to device 190 and/or application 150 and in response to receiving the context sensitive content at device 190, replaying the received context sensitive content 184 at device 190.

Thus, in synchronization system 100, audio watermarking 110, i.e. encoding of unique audio identifiers 110, is used to convey information and/or triggering signals 115 in a context sensitive manner via acoustic sound 135 from audio emitters 140 to devices 190. Using error correcting code scheme 120 as well as the modulation schemes 130, this audio broadcast 135 of audio emitter 140 to microphone 145 is encoded and therefore robust against fraudulent activities and deciphering.

In some implementations, this broadcast may be unidirectional, i.e. audio emitter 140 may (only) transmit audio signals to device 190 and may not be equipped to itself receive, record, and decipher respective encoded audio signals 135. However, in some implementations this audio broadcast may also be bi-directional, allowing for feedback loops between application 150 and/or device 190 and audio emitter 140. Thus, in some implementations device 190 may itself also be provided with an encoder 120, modulator 130, and/or audio emitter 140 capability. Such capability may be implemented using hardware component and &o maybe implemented using at least In part software application elements, e.g. application 150.

In such implementations, in response to receiving and decoding signals 135, application 150 and/or device 190 may be triggered to generate a triggering signal 115 itself and using that, together with a unique audio identifier 110 identifying device 190 and/or user 191, to perform via device 190 and or application 150 error correcting encoding 120 to generate signal 125, and applying modulation schemes 130 to generate from signal 125 the modulated high frequency audio signal 135. This modulated high frequency signal may be is transmitted back to audio emitter 140 via e.g. a speaker 147 of device 190. In such implementations, audio emitter 140 may not only be equipped with installations configured for emitting acoustic sound 135, but may also be equipped with a microphone and further computing capabilities to notice, record, and decipher a modulated audio signal 135 transmitted from device 190 as an acoustic sound 135 to via speaker 147 to audio emitter 140.

Thus, example implementations of audio synchronization system 100 may implement an audio emitter 140 unidirectionally conveys modulated audio signals 135 to trigger a device 190 to execute an operation associated to a triggering signal 115 in a context sensitive way. In further example implementations, audio emitter 140 may also convey modulated audio signal 135 to other audio emitters 140. In further implementations, device 190 may itself, via application 150 and speaker 147, be configured to operate as an audio emitter 140 and may thus convey modulated audio signals 135 to one or more audio emitters 140. Alternatively and/or additionally, some implementations may also have devices 190 communicating to each other by conveying back and forth audio signals 135.

In some implementations, ultra-low energy design principles are implemented to equip audio emitters 140 and/or devices 190 with the physical capabilities to emit audio signals 135 and/or detect and record audio signals 135. In some implementations, such ultra-low energy design may be supported by using piezo and electrostatic components. Some implementations, for example, may feature micro electromechanical systems (MEMS) for realizing micro speakers and/or MEMS as microphone chips equipping audio emitter 140 and/or device 190 with micro mechanic sound generating and/or sound recording capabilities that reduce the number of moving parts, provide electrostatic drive and thus support ultra-low energy design.

Audio synchronization system 100 thus provides a context sensitive high frequency audio signal 135 that conveys a digital unique identifier 110 as an audio watermark using an audio channel at a frequency that, at least in some implementations, uses a range of frequencies not noticeable to the human ear due to its frequency and/or volume. The modulated acoustic signal 135 in these implementations is thus marked by an audio watermark 110 that may, for example, identify an audio emitter 140 and/or a device 190 emitting the modulated audio signal 135 and thereby characterize the context of the listening device, i.e. the device detecting the watermarked audio signal 135.

System 100 further encompasses software or application 150 that allows for using a device 190's microphone 145 or a microphone of audio emitter 140 to detect a modulated audio signal 135 for deciphering such high frequency signal 135 and identifying the watermark 110 encoded into that signal 135. The identification of watermark 110 allows for relating this unique audio identifier to the source of the modulated audio signal 135, for example audio emitter 140 and/or device 190, in order to characterize the context of the triggering signal 115. Accordingly, i.e. taking into account the triggering signal 115 as well as the context identified by unique identifier 110, device 190 and/or audio emitter 140 is triggered to execute an operation and/or a sequence of operations in a context-sensitive manner as identified by the context associated with the de-coded watermark 110 and the decoded triggering command 115. For example, device 190 may be triggered to request supplementing content from a source 182, for example from an external content provider 182 and/or an synchronization service provider 180 or may additionally or alternatively be triggered to retrieve a pre-installed complementary content and display such content on a display of device 190.

In some implementations, device 190 and/or audio emitter 140 may be configured by, for example, application 150 to continuously use microphone 145 to scan the acoustic environment surrounding device 190 in order to notice and identify an audio signal 135. However, in some implementations, audio signal 135 may also be configured for waking up device 190 and/or audio emitter 140 by using a predefined triggering signal that initiates a listener mode at audio emitter 140 and/or device 190. In any case, a high frequency digital audio watermark 110 is used to convey data communication 125 via an audio channel 135 not noticeable to the human ear for having devices 190 interact as listeners with senders like audio emitter 140.

For this, audio emitter 140 generates a high frequency audio signal 135 that is played back via a speaker of audio emitter 140 in order to be conveyed to a listening device 190. In some implementations, audio emitter 140 may also be equipped with a microphone in order to capture noise present in the surrounding environment of audio emitter 140 for adapting volume and/or modulation scheme 130 while generating the high frequency signal 135 such that it is clearly noticeable for a listening device 190 within a defined surrounding environment of 5 or 7 or 10 meters around audio emitter 140.

In some implementations, applying the error correction code 120 on triggering signal 115 and audio watermark 110 as well as applying the modulation scheme 130 may be done on the fly, i.e. substantially in real time, such that audio signal 135 is played back by audio emitter 140 directly after having been generated by applying error correcting code 120 and subsequently applying modulation schemes 130.

In some implementations, this coding and modulating may, however, also be performed in an offline mode such that after having applied error correction code 120 and modulation schemes 130 on triggering signal 115 and watermark 110, an audio file, for example a WAV file is created that holds audio signal 135 and is stored for later use. Thus, in some implementations, this generating of audio signal 135 via error correcting coding and modulating may be performed by an audio emitter 140, by a device 190, but may also additionally and/or alternatively be provided by a synchronization service provider 180 or any other entity 182 and or entity 186 that may or may not be depicted in the simplified illustration synchronization system 100 of FIG. 1.

Thus, audio signal 135 may be predefined offline or may be created and integrated into a live stream substantially in real time. Such audio signal 135 may be played once or may be used repetitively for different devices 190. In some implementations, such audio signal 135 is created such that its frequency range may be between 15 and 22 kHz such that the signal 135 is substantially not noticeable for the human ear due to its frequency. In this frequency range, audio signal 135 is created as a noise pattern that may be conveyed as an audio signal 135 at a point in time where the operation and/or interaction triggered by triggering signal 115 is desired. At this point of the desired interaction, audio signal 135 may be generated and conveyed or may be requested from a database 180/182 and/or any other source 186 of such pre-generated audio signals 135 and replayed via a speaker 147 of device 190 and/or audio emitter 140.

Thus unique audio identifiers or sound watermarks are used for establishing an audio channel via one or more audio emitters or other acoustic sources to convey a triggering signal or other digital information as a modulated high frequency sound signal or acoustic noise. Using acoustic noise or in other words an audio signal that is sent out from an audio emitter, e.g. a speaker or loud speaker at a high frequency enables to transmit or rather broadcast the respective information or signal such that the sent-out modulated noise or sound signal is not perceptible to the average human ear.

The transmission of the modulated sound signal or acoustic noise may be done with a speaker of an audio emitter. Thus, in example implementations, an audio emitter transmits or broadcasts a high frequency acoustic noise carrying an information or digital signal. This acoustic signal, broadcasted or transmitted by a speaker of an audio emitter is detected by a microphone of an audio receiver that receives the broadcasted or transmitted audio signal for further processing. The resultant audio signal is detected by the receiver, de-modulated, decoded and by that, at the receiver's end the original information or digital signal is made available for further processing or execution.

For this, in example implementations the information or digital signal or triggering command is encoded, e.g. with an error correction method or coding scheme and then modulated by a combination of frequency shift keying (FSK) and amplitude shift keying (ASK). In example implementations, quadrature amplitude modulation (QAM) maybe used which conveys message signals by modulating the amplitudes of two carrier waves using amplitude-shift keying (ASK) and/or frequency shift keying (FSK). These two carrier waves of the same frequency are out of phase by 90°. The modulated waves are then summed and the resulting signal is a combination of phase-shift keying (PSK) and amplitude-shift keying (ASK). For this modulation, in aspects of the present invention a frequency range is selected that is non-audible for an average human ear. Alternatively however, also frequency range may be selected that is indeed audible for humans.

In example implementations, this modulated signal is transmitted or conveyed, i.e. broadcasted via a loud speaker, e.g. a speaker of an audio emitter, so that an audio receiver, e.g. a mobile phone can receive or detect the signal within a predefined range, e.g. up to 10 meters, wherein this range maybe selectable bayed on the signal strength or the broadcasted or transmitted audio signal or acoustic noise, i.e. the volume of the noise or acoustic signal.

In aspects of the present invention, the audio receiver receives the transmitted or broadcasted audio signal with a microphone. In aspect of the present invention, in response to detecting the transmitted signal, the audio receiver may record the broadcasted signal. Then, in aspects of the present invention the receiver may proceed with demodulating the received and/or recorded acoustic noise. Further on, the receiver may subsequently carry out the decoding of the demodulated signal based on the originally applied error correction method or coding scheme. Depending on the thereby obtained, decoded information or triggering command, the receiver continues executing corresponding further steps as determined or predefined by the original information or digital signal (for example, requesting and subsequently rendering context-sensitive supplementary content, coupons etc.).

In example implementations, a listening device 190 may be any device that has, or has access to, a microphone 145 and is configured to detect and record audio signals 135 in its environment. Such device 190 may, for example, be a smart device such as a smartphone, a tablet and/or a smartwatch, but may also be rather simple devices equipped with a minimal amount of computing power and equipped with micro-electromechanical systems for providing microphone capabilities.

Such a listening device 190, besides microphone 145, may be equipped with an application 150 that is configured for recording an audio signal 135 as detected within the noise present in the surrounding environment of listening device 190. Thus, application 150 provides listening device 190 with the capabilities for listening to the noise present in the environment of device 190 and detecting a high frequency watermarked signal 135. Further, application 150 configures a listening device 190 with capabilities for deciphering and/or decoding recorded audio signal 135 for identifying the triggering signal 115 as well as the unique audio watermark 110.

Based on that, unique audio identifier synchronization system 100 may enable audio emitters 140 to perform in analogy to acoustic sticky notes: the audio emitter 140 via watermarked signal 135 allows for relating a listener device 190 to the emitter's context such that the listener device is enabled to pull respective content from server 180 or provider 182 that is associated with the watermark 110 detected in the audio signal 135. Thereby, information 184 can be exchanged between devices 190 in a secure, automated and location and context-based fashion as the content is held on servers 180 and or at provider 182 rather than emitters 140.

Application 150 providing such capabilities to device 190 may be computing code implemented on a computing device 190. In some implementations, application 150 may in some example implementations also be code and or components of an embedded system, and/or in further implementations be mainly implemented with hardcoded logical functions built into hardware of a device 190. However, these types of software and/or hardware implementation of software 150 on a listening device 190 only serve as illustrative examples and in further implementations also additional and/or further types of implementations may be used.

As an exemplary embodiment, for example, a smart device 190 may serve as the emitter 140 of an audio signal 135. In such exemplary implementations, such a smart device 190 may be a smart phone, a tablet, and/or a smartwatch. However, these devices rather serve as illustrative examples of mobile devices 190 serving as audio emitters in this exemplary embodiment and in further implementations also additional and/or further types of devices and emitters may be used.

In example implementations, a mobile device may serve as an audio emitter by using its build in signal tone capabilities (e.g. ring tones generator and the like) to send or rather broadcast a modulated signal generated from a triggering command and a unique audio identifier. Thus, in example implementations e.g. the ring tone of a mobile device may contain and convey a watermarked audio signal, the ring tone thereby providing an audio channel to convey a triggering signal or other digital information as a modulated sound signal or acoustic noise.

Figure 2:
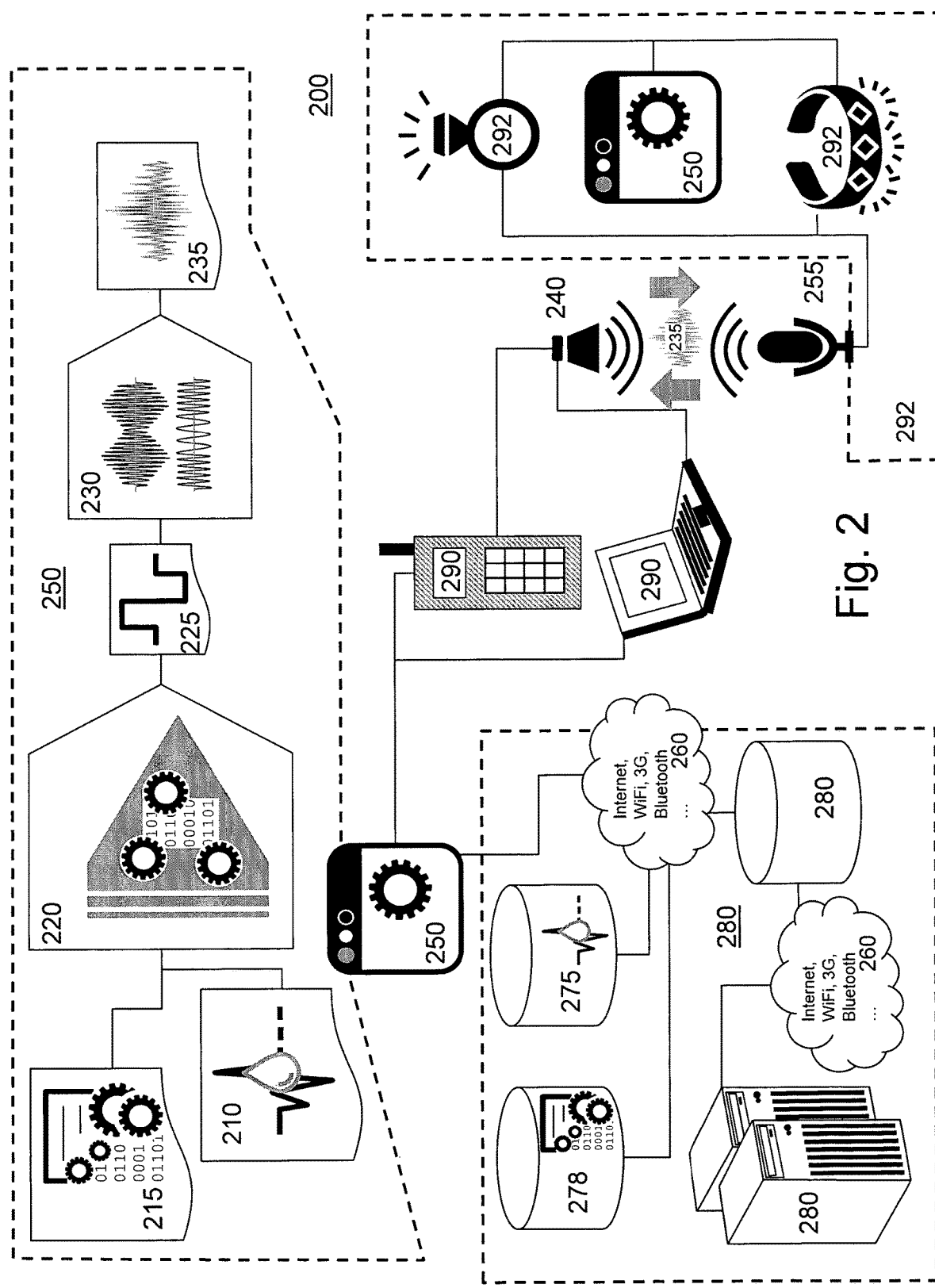
FIG. 2 schematically illustrates examples of synchronizing a mobile device with body worn jewelry, key or electronic appliances.

FIG. 2 for example schematically shows an illustration of such an implementation of synchronization system 200 where a mobile device 290 has installed thereon software and/or applications 250 that provide device 290 with capabilities for applying error-correcting coding 220 onto a triggering signal 215 and a unique audio identifier 210, the unique audio identifier 210 e.g. uniquely identifying device 290 and/or the context of device 290. Moreover, software 250 provides device 290 with capabilities to modulate the resulting digital signal 225 using modulations schemes 230 for generating a high frequency audio signal 235.

This watermarked audio signal 235 is broadcasted by device 290 via replaying the audio signal 235 through a speaker 255 built into device 290. This watermarked audio signal 235 conveyed via speaker 255 of device 290 is noticed and received by a listening device 292. Examples for such listening devices are exemplarily illustrated in FIG. 2 as e.g. body-worn jewelry, for example, a ring 292 or a bracelet 292. These forms of body-worn jewelry 292 and/or body-worn jewelry as a category only serve however as illustrative examples only and in other implementation of system 200 other forms and/or categories of listening devices 292 may be used to implement system 200.

In the example illustrated in FIG. 2, the body-worn jewelry 292 may be equipped with micro-electromechanical systems (MEMS) providing microphone 255 capabilities for monitoring the noise present in the surrounding environment of that body-worn jewelry 292. In that example, body-worn jewelry 292 equipped with microphone capability 255 and some computing power 250, for example a ring 292, a bracelet 292 or a door key or a car key 292, may thus be equipped to detect an audio signal 235 via microphone capabilities 255, in some implementations, such device 292 may equipped with means 250 for decoding audio signal 235 in order to identify the audio watermark 110 characterizing device 290 and/or its context as well as identifying the triggering signal 115.

For example, the identified triggering signal 115 may trigger a ring 292, bracelet 292 or key 292 to emit a light signal. This light signal in some examples may be provided by an LED that backlights precious stones of a ring/bracelet 292 and may make the user of such device aware that some event having been triggered, for example that mobile device 290 has received a new phone call and/or some other form of new messaging. For realizing such functionality with body-worn jewelry 292, such jewelry 292 may be equipped with micro-electromechanical systems for realizing microphone capabilities 255 and further micro-electromechanical systems for realizing energy-harvesting capabilities to generate and store enough energy for executing the de-modulating and de-coding capabilities 250. Such micro-electromechanical systems may be, for example, a microphone 255 realized with piezo elements that are dirt and waterproof. An electromagnetic coil may, for example, be formed as a ring being in fact the body worn-jewelry 292 in some implementations. Additionally and/or alternatively, electrical energy may also be provided via a minimized battery, a rechargeable battery, condensators or super-capacitors. In some example implementations, where the electromagnetic core is implemented, the small magnet may move as a mechanical balance spring to create at least a minimal amount of electrical energy.

In some implementations, an LED may provide a backlight for jewels, the LED itself providing different colors in at least some implementations, for example, a red color indicating something of high urgency or a green color for indication something that is confirmed positively and/or a blue color for other indications.

However, as discussed further above within the context of FIG. 1, the routing path of audio signal 235 may in some example implementations also be turned around. For example, device 292 may be a door key or a car key 292. In such embodiments, the key 292 may generate and convey an audio signal 235 via audio emitter installation that convey some kind of credential that authorizes, enables and triggers receiving mobile device 190 to e.g. open a door for access and/or unlock, for example, the electronics of a car in order to enable the user of mobile device 290 to start the car without in effect using the car's key 292 but mobile device 290 instead.

Figure 3:
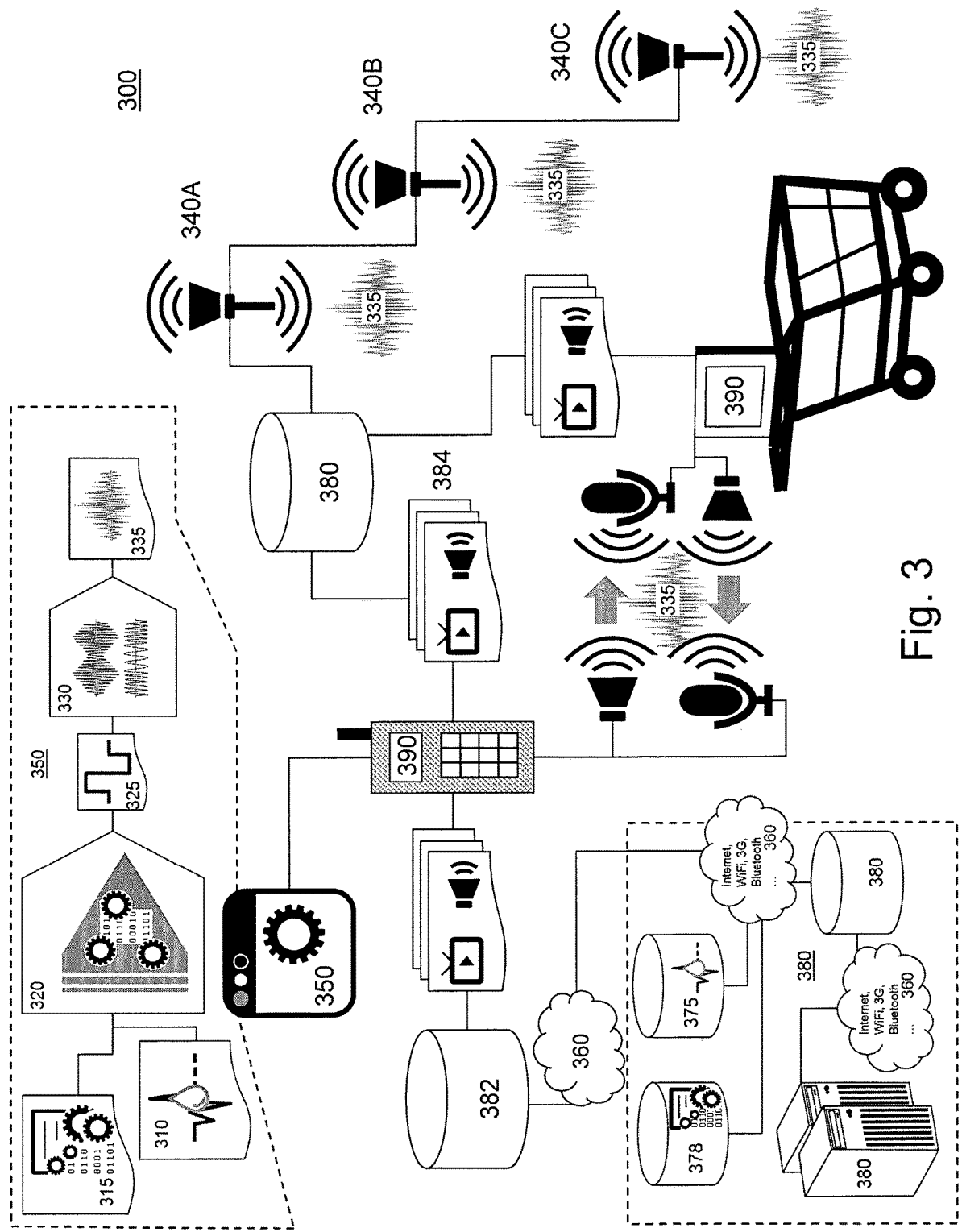
FIG. 3 schematically illustrates an example implementation of an unique audio identifier synchronization system providing an electronic applicated shopping instrument (EASI) to users.

FIG. 3 schematically illustrates an example implementation of an unique audio identifier synchronization system providing an electronic applicated shopping instrument (EASI) to users.

In example implementations, system m100 and/or 200 as illustrated FIGS. 1 and 2 may be further enhanced to realize EASI, and electronic shopping applicated instrument 300. In some implementations, a mini-computer with monitor 390 may for that be firmly mounted on a shopping cart and via watermarked acoustic signal 135 emitted from a mobile device of a customer taking the shopping cart that mini-computer may be associated with the customer, 191 and/or the customer's mobile device 190. Alternatively or additionally, this associating of the customer's mobile device 190 with the mini-computer 390 may also be performed using other means of nearfield communication, e.g. Bluetooth, NFC, etc.

In example implementations, vendor 380 has provided a website on which a visitor 191 has previously been identified such that this visitor 191 now has a user profile 188 at vendor 380 and can thus use the shopping cart with the mounted monitor for example without a deposit or the like. This is in example implementations realized such that based on the link build using the watermarked audio signal 135, acoustic coupling between the mini-computer 390 and the mobile device 190 of the visitor 191 is realized to unlock the cart's access system and providing a customer access to the cart and its monitor.

The mini-computer either by detecting the watermarked sound signals from networked acoustic emitters 340A-340C or other appropriate means of nearfield communication (Bluetooth, NFC, etc.) navigates indoor and actively communicates back to audio emitters 340A-C. In the course of this communication, for example vendor 380 can provide information and/or content items 184 to be displayed on the monitor of device 390. Further, the monitor be used for searching for specific items in the store and acoustic synchronization system 300 may subsequently be used to navigate a customer to the products, the customer has previously searched for. For this, the monitor mounted to the shopping cart may show a suitable and or e.g. the shortest route to items on the shopping list created either with mini-computer 390 or pulled from the min-computer from a servicer 192 in response to identifying the profile 188 of user 191.

enriched with acoustically conveyed watermarked messages from the vendor 380, the cart may further lead the customer 191 along e.g. action items for which currently e.g. a discount is offered. While this shopping guidance has been illustrated here at the example of a permanently fixed monitor at a shopping card, the same capabilities could be implemented on the platform of a mobile device 190 or an application on150 designed for such mobile devices without having to mount these to a shopping cart.

Figure 4:
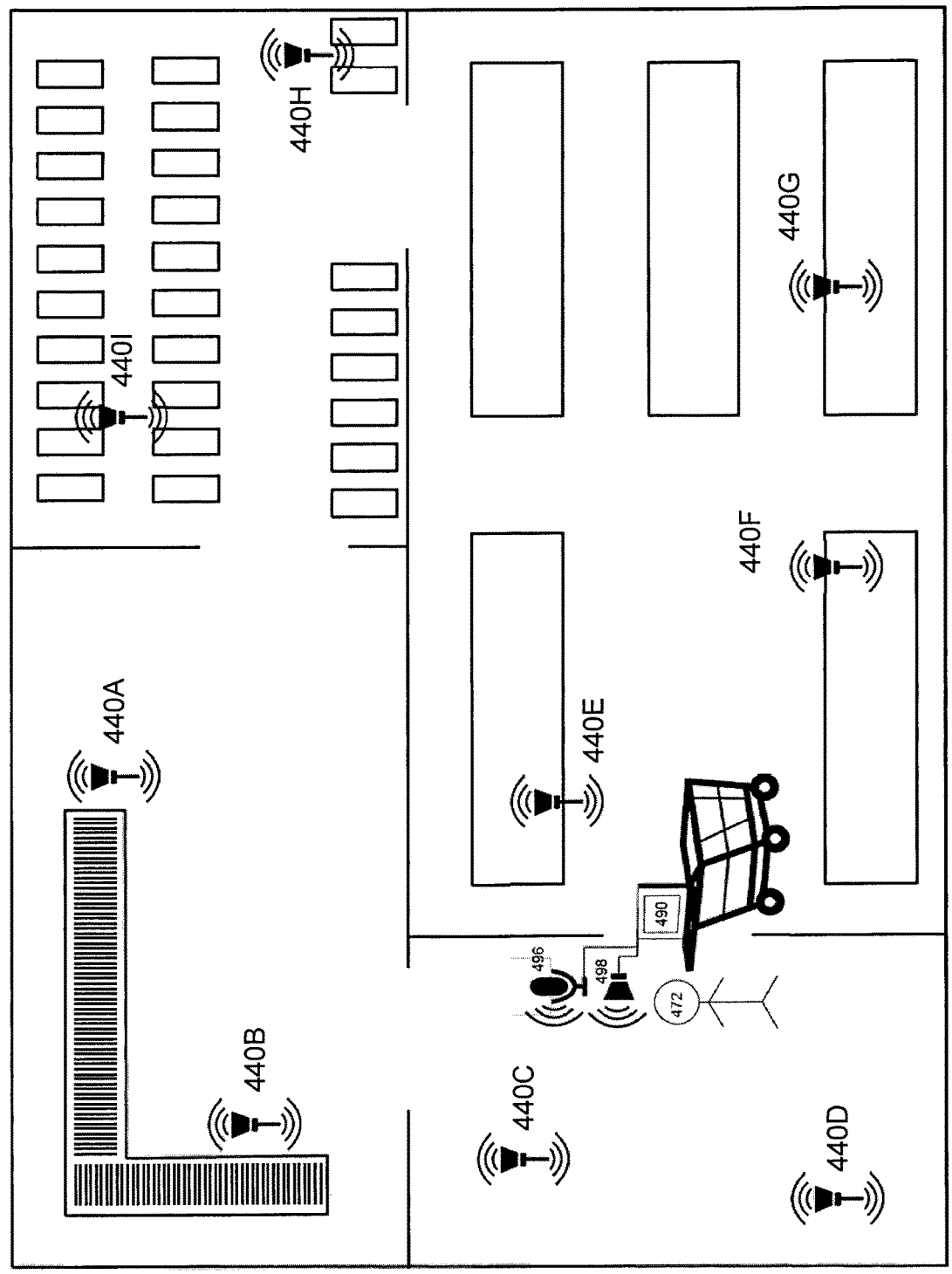
FIG. 4 schematically shows an example implementation for indoor positioning of a user using unique audio identifier based synchronization and acoustic triangulation.

FIG. 4 schematically shows an example implementation for indoor positioning of a user using unique audio identifier based synchronization and acoustic triangulation.

The schematic illustration of FIG. 4 shows an indoor architectural configuration of e.g. a shopping mall making use of the unique audio identifier synchronization system 100/200/300. In the example implementation of FIG. 4, a number of audio emitters 440A to 4401 is used to not only convey high frequency watermarked audio signals 135 to devices 490 but also to receive respective watermarked audio signals 135 from devices 490. The indoor position of audio emitters 440A-1 is well defined and their emittance of audio signals 135 may be tuned such that device 490 is capable to only detect the broadcasted sound 135 from emitters 440A-4401 within a well-defined range or radius around each of the emitters respectively.

The triangulation of the position of user 472 operating with devices 490 may by performed using different approaches that take advantage from correlating the signals 135 conveyed and received by either emitters 440A-1 and/or devices 490. For example, the speed of sound can be used as a parameter to detect the difference in the time it takes for noticing a signal send out from some of the plurality of audio emitters 440A-I at device 490. Or vice versa, at at least three different emitters 440A-1 the time is measured that a signal I135 send out from a device 490 takes to reach each of the three different audio emitters 440A-I. Comparing these three measurements allows for determining the location of user's 472 position when taking into account the difference in time of flight at the three different positions. For example, the three different emitters 440A-I work together to triangulate the location from which the watermarked signal 135 is emitted, the signal uniquely identifying user 472 operating at deice 490. In example implementations, further means for near field communication or the like may be employed fur enhancing accurate of position triangulation as well as speed of detection.

Using a watermark synchronization App 150, visitors 191 can thus be provided with seamlessly context-sensitive content. Applications maybe on health, trade, service, as well as events or public authorities. Via application 150 visitors may receive detailed information as well as exclusive audio and video content 184 on their mobile devices 184. When approaching specific areas of interest, application 150 offers access to interactive content elements 184. This may for example aim at providing users 191 with an intensive visitor experience and to provide comprehensive information. For example, a user 191 may be made aware in a context-sensitive fashion on an interactive event plans or further appointments. Moreover, using the acoustic triangulation capabilities of system 100/200/300, precise indoor navigation can be provided that allow for finding the way using audio transmitters 140 rather than searching it. Here, audio emitters 440A-I provide a suitable means for navigation in confined spaces where no GPS signal is available. This can be realized at low cost for even larger areas as the watermarked sound signals 135 enable to efficiently cover larger areas. Such improved indoor navigation as schematically outlined in FIG. 4 improves the user experience and may generate additional business potential as for example the customer 191 can be navigated to a desired product and routes of customers may be targeted based on determined contexts and interests. Herein, customers may be nudged regarding the route they take indoors to guide them following paths that walk by products of interest.

Moreover, customers 191 may be provided with custom welcome messages on their mobile terminal 190 taking into account their current context as well as their individual profile 188 history. Such custom messages in example implementations may achieve both, personally addressing a customer and realizing site-specific messages. For example, relevant information regarding an event or similar information can be quickly and easily sent to all visitors 191 of a site. Individually approaching customers 191 this way sustainably increases their loyalty and strengthens a personality relation. In example implementations, unique audio identifier synchronization system 100 may thus be connected and/or integrated with check-in systems to add context sensitivity to access control situations. For example, when a user 191 arrives at some venue, that user 191 may automatically receive an automated yet individualized welcome message will be sent to the smartphone or tablet 190.

Besides, the triangulation capability of system 100 further allows for implementations that allow for device location, for example in health care applications. 'Here, system 100 may be employed to realize asset tracking as a comprehensive monitoring of equipment and improvement logistics processes. Further, patients 191 themselves may wear audio emitter devices conveying a watermarked audio signal 135 that reliably and automatically transmits to listening devices 190 which person is entering the respective area and what type of treatment or medication should be administered. This supports patients 191 in their self-sustained orientation and navigation within a clinical environment.

In examples of retail implementations, audio emitters 140 may be distributed throughout a store to play out complementary content 184 to smart devices of customer. This complementary content based on encoding the audio signal 135 with watermark 110 can be context-sensitive, for example individualizing the played out content per store.

Besides, for example in transportation, sending of high frequency audio signals 135 from a mobile device 190 may allow for easy onboarding with simplified, fast and automated processing of boarding using e.g. digital identification of a customer conveyed via the encoded watermark 110 as a unique audio identifier of that customer. Thereby, an automated check-in can be realized that allows for contactless and comfortable detection of incoming guests 191 and validating of tickets as well as tracking of people. This can be used to personally address incoming guests 191 as predefined locations in order to increase customer loyalty and service quality.

For this, listener devices like e.g. a smart device 190, a smartphone, tablet or smart watch have integrated microphone capabilities. This enables the device 190 to receive the encoded and modulated audio signal 135 at the described high frequency to detect the watermarks 110. The detected watermark 110 is sent by the application 150 to a server 182 that send an answer back to the smart device 190. This may initiate further interactions. In example implementations, the recognition of the high-frequency audio signal 135 can be performed within seconds, in some implementations on mobile phone for example within 2 seconds. after the signal from a speaker 140 is broadcast over a distance of about 7 meters.

FIG. 5 illustrates a mobile device 500 that may be an example implementation of mobile device 190 of FIG. 1.

Mobile device 500 runs application 150 that allows for supplementing the content consuming experience of user 191. Using audio synchronization system 100 this experience on mobile device 500 offers a new dimension of a media usage. More particularly, in example implementations, visual complementary content item 184 may be used by user 191 in parallel with consuming e.g. audio content via application 150 running on mobile device 500. By this, one-way push transmission from advertisers 186 is transformed into targeted multichannel communication. The targeting is achieved by calculating a current audio context using e.g. currently rendered content and/or characteristics of an individual users profile 188 and/or characteristics of a vendor 186.

As indicated in the example implementation of application 150 in FIG. 5, the complementary content item 184 may provide not only supplementing visual information and/or images, but also may also serve for providing interactive functionalities for listening, voting, gaming or even sending individual contributions of a user 191 to vendor 186. Audio synchronization system 100 provides new ways of a digital transmission of audio & video content which is synchronized with complementary content items 184 to allow for new ways of consuming augmented content on a mobile device 190.

More particularly, in some implementations vendor 186 may provide more targeted way of addressing users 191 that takes into account individual feedback by a user 191 via application 150 such that vendor 186 is able to provide on demand offerings thereby individually targeting and shaping and providing complementary content items 184. This interactive exchange with user 191 is moderated by complementary content provider 182 by synchronizing the providing and transmission of complementary content items 184 with the current context of user 191 active on device 500 via application 150. Accordingly, in some implementations, application 150 on device 500 complements a current context of user 191.

This supplementing of radio broadcasting 105 by complementary content items 184 can, for example, in some implementations be used to create personalized individually targeted advertising that is adding to the advertising capabilities provided by traditionally provided content. This enables a high value advertising environment provided by application 150 to both, marketing agencies and advertising companies. To provide that, service provider 180 in example implementations provides a software solution that is present on end device 500 as an application 150. Application 150 in example implementations is operated by user 191 for both consuming audio and/or video content as well as interacting with, watching, and or listening to complementary content items 184 provided in-sync and rendered in-sync with the respective context via application 150. In example implementations, in response to analyzing the current context of user 191 and end device 500, for example, visual complementary content items 184 are audio-visually synchronized to currently being replayed content.

In example implementations, in response to analyzing the current audio context of user 191 at device 500, matching complementary content, for example visually complementary content items 184 are audio-visually synchronized to a currently being replayed audio content. Thereby, for example, a matching visual advertisement 184 can be blended into audio content via application 150 on the basis of the analyzed context of user 191. In FIG. 5, device 505 illustrates an example in which the advertisement for a computer device 510 is blended into the current replay of audio content indicated by the playback button 512 and the name of the tuned radio station 514.

While the specific implementation of the blending in of advertisements in example device 505 just serves for illustrative and exploratory purpose, this example implementation shows that application 150 together synchronization services 180 may offer the service of positioning context-sensitive affiliate advertisements by interconnecting characteristics of the vendor 186 to characteristics of the currently being played media content taking additionally into account individual user profile data 188, characteristics of the currently being replayed e.g. audio track 105 and the like. Thereby, the currently being replayed audio content, for example a piece of music, a piece of editorial content, a piece of news or an audio advertisement can be supplemented with a synchronized, for example, visual still or moving image element to create an enhanced and high value advertisement sequence. In example implementations, thereby personalized advertisement campaigns can be created that combine the use of audio spots with user data and interactive response elements like, for example, push messages 184.

This allows vendor 186 to create an content program that combines audio content with complementary content items 184 to create a seamless combined audio-video experience via application 150 for user 191. This, in example implementations, can be used, for example, for a synchronized audio-visual marketing of products and services via individually targeted, personalized radio advertisements that are not only provided by audio but further enhanced by synchronized with visual content 184.

In addition, application 150 may provide interactive elements and further application options as indicated in example interface 520. Here, besides the name of the tuned in radio station 522, and a playback/pause control 524, further options are provided for buying 526, for example, the current playback music item 105, voting 528 on the current radio broadcast, sending 530 an individual message to the vendor 186, taking advantage of a gaming 532 options, and changing or adjusting radio program preferences 534. Besides, exemplary interface 520 of application 150 provides options to gain direct access to social networks 536, entering text commentaries to the running of broadcasting content 105, as well as reading such text comments 540 of other users. The name of the user profile 542 is displayed as well as a user status, for example, in terms of a user's score 544 that a user may have earned in response to having interacted with the vendor 186. In addition, a fixed area 550 may be provided to show visual content items 184 in relation to the currently being rendered content, such as, for example, advertisements, information on the current editorial content, further information on the currently being played back artists and the like.

Selecting a control 530 for sending individual messages may enable a user to access interface 551 of application 150, which provides an option to record an individual message that may be sent by user 191 to vendor 186 in response to the currently being replayed audio content 105. For that, application 150 in interface 551 provides a record control 552 that starts and ends the recording of the individual message. Moreover, the user may be provided with sub-categories 554 that allow the user to characterize his or her recorded message as being a remark to the content, greetings or commentary to current news. Thereby, in example implementations, the user 191 is provided with interactive options 551 that transform the formerly passive user into an active user that directly communicates via application 150 and complementary content provider 182 with his or her vendor 186.

In some implementations, application 150, for example, as a smart phone application, opens up a channel for direct interactivity between content creators and content listeners. This converts listeners into direct users and thereby in some implementation also enables higher value, personalized and individually targeted advertisements. Via complementary content items 184, these advertisements may not only be synchronized with audio content to create a visually amplifying of audio advertisements, but further creates a user-targeted program that allows for audio context sensitive additional advertisements provided as complementary content items 184.

Application 150, in some implementations, therefore, provides functionalities for listening to a streamed content provided by vendor 186. Illustrated with interface 551, application 150 further may provide options for recording individual sound files, for example individual messages, by a user 191. The user may send these individually recorded messages to the vendor 186, for example categorized by one of a number of predefined topics 554. In some implementations, vendors 186 may predefine such categorizing of topics such as remarks, greetings or comments on ongoing topics and the like.

Moreover, application 150, in some implementations, may provide an option for voting 528. This voting may allow a user 191 to have influence and impact. Interface 560 shows example implementations of such voting functionality of application 150. Further, in example implementations, application 150 may offer several mini-gaming options 532 to provide users options for gaming while listening to content.

Moreover, in example implementations, application 150 may enable a user to create an individual user profile that may be enriched with individual information on the user such as, for example, a name, an alias, one or more social network IDs, age, gender, music preferences and the like. Interface 570 shows example implementations of such an individual user profile that further shows a scoring option 572 that allows a broadcasting source to award scores to a user 191 for having actively contributed to a radio broadcast. Depending on the scores 572, a user ranking may be created that further allows a vendor 186 to create an incentive mechanism for users 191 to actively contribute to radio program 105.

Interface 580 further shows an example implementation where a complementary content item 184 uses the whole interface size of application 150 to display a complementary content item 184 in-sync with further content being currently replayed. Here, in the example of interface 580, a quiz is provided that presents a user with a question 582 regarding a presented visual element 584 and several answering options 586. Thereby vendor 186 is enabled to create appropriate quiz competitions that are synchronized as complementary content items 184 with a user's context and to be cross-faded over the entire screen of application 150. While this quiz is blended in, content replay may continue and, for example, advertise the quiz.

By participating in such a quiz or for other forms of active participation, users 191 may score by voting or taking part in quizzes, using the offered gaming options, creating posts, sending commentaries or individually recorded messages or may simply be awarded with scores for active participation at defined times such that any of the individual users 191 can be respected or rewarded as an individual contributor.

Furthermore, options for initiating a purchase in relation to the replayed content may be provided that may lead a user 191 to online shops for buying, for example, currently played music items. Text commentary by users entered either by using the commentary option 538 of application 150 or using social network links 536 may be analyzed and also created by vendor 186 using standardized syntax functions that can associate social network links to an individual user's profile 191 with defined actions like, for example, a user having won a quiz, a user having voted on a specific piece of music, or a user having reached a particular score level and/or providing a link to the respective application 150.

In example implementations, synchronization service provider 180 may offer predefined templates that allow vendor 186 to create an individual application 150 based on customizing the provided, predefined templates with an application design and performing a configuration of application functionality. In example implementations, vendor 186 may be provided by synchronization service provider 180 with a web front-end application that allows for remote controlling of the individualized application 150 and the various end devices 500. This allows a vendor 186 to create games, to blend sent-in commentaries into current content context, to react to the outcomes of a voting activity, to send personalized advertisements and the like. Thus, in example implementations, synchronization service provider 180 prompts an application configurator to vendor 186 as well as a campaign manager application to allow a vendor 186 to dynamically adjust an individual content stream supplemented with complementary items 184 to target individual users 191 and their individual audio context.

This allows vendor 186 to create context-sensitive and user individual targeted radio advertisements that blend audio advertisement spots 105 with complementary visual still or moving image items 184 such that this blending is synchronized and remotely managed to be context sensitive with respect to the individual context of user 191 and device 500. While, for example, advertisements may thus be personalized and sent to end device 500 in an context-sensitive way, the experience of user 191 may be further enhanced by amplifying the impact of advertisement via a synchronized visual amplifying of the advertising message by rendering additional visual elements 184 in sync with broadcasted contents on an end device 500. Moreover, complementary content item 184 may even further enable a user 191 to be directly relayed to a point of sale to purchase the item currently being advertised, for example a piece of music, a book or any other item.

FIG. 6 schematically shows an example sequence of a computer-implemented method 600 for dynamically synchronizing devices with complementary content based on supplementing audio broadcasting with unique audio identifiers The sequence starts in step 602 generating and providing a plurality of audio watermarks 110. In step 604 of method 600, in addition a plurality of triggering commands 115 is provided. In step 606, a triggering command 115 is linked with watermark 110 and both are encoded. The signal 125 resulting from step 606 is modulated in step 608 to transform the signal 125 into a high frequency audio signal 135, preferably not noticeable to a human's ear. This resulting high frequency audio signal is transmitted via audio emitter 140 in step 610.

The broadcasted audio signal 135 is detected in step 612 by a mobile device 190 and recorded for de-coding and de-modulating, on device 190. This decoding and demodulating is performed in step 614 by application 150 on device 190. Based on the decoding and demodulating, initially encoded and modulated watermark 110 and triggering command 115 are identified by application 150 on device 190.

Based on the identified watermark, in step 618, a current context is determined for user 191, device 190 further taking into account user profiles 188 and further vendor information. The determined context is taking into account for executing the identified triggering command which is executed according to the determined content in step 620.

In example implementation, in step 622 triggering command 115 is executed to transmit complementary content from complementary content provider to device 190. Finally, in step 624, the received content is rendered by application 150 on device 190.

From the forgoing and further it will be appreciated that, although specific embodiments have been described herein for purposes of illustration, various modifications may be made without deviating from the sprit and scope of the present disclosure. For example, the methods, techniques, computer-readable medium, and systems for providing dynamic audio-context-sensitive synchronisation of complementary broadcasting content for supplementing audio broadcasting discussed herein are applicable to other architectures and other system architectures depicted. Also, the methods, techniques, computer program products, and systems discussed herein are applicable to differing protocols, communication media (optical, wireless, cable, etc.) and devices (such as wireless handset, electronic organizers, personal digital assistants, portable email machines, game machines, pagers, navigating devices such as GPS receivers etc.).

The invention claimed is:

1. A computer-implemented method for dynamically synchronizing complementary content with a context of a mobile device based on broadcasting an audio signal with unique audio identifiers, the method comprising:
   providing by an audio synchronization system a plurality of unique audio identifiers, each identifier associated with one or more complementary content items which are mapped to at least one predefined context, wherein the context dynamically characterizes the context of a situation and/or location of the mobile device;
   providing by the audio synchronization system a plurality of triggering commands, wherein at least one of the plurality of triggering commands is associated with at least one of the unique audio identifiers;
   encoding by the audio synchronization system or the mobile device the at least one triggering command together with the at least one associated unique audio identifier into a digital signal, wherein the at least one triggering command may be encoded together with different unique audio identifiers, and applying modulation schemes to generate a high-frequency audio signal to be broadcasted by an audio emitter;
   receiving, on a mobile device, the broadcasted audio signal, wherein the broadcasted audio signal is played back as a single standalone audio signal;
   determining by an application service or the mobile device in response to the receiving the context associated with the at least one unique audio identifier based on decoding the received signal and dynamically recognizing the at least unique audio identifier in the currently broadcasted audio signal;
   executing by the application service or the mobile device the at least one triggering command as recognized from the decoded signal.

2. The method of claim 1, further comprising the step of providing a user profile comprising characteristics of the user operating the mobile device by synchronization service provider and/or complementary content provider, wherein determining the context further is based on identifying characteristics of the user's profile.

3. The method of claim 1, further comprising:
   creating and storing complementary content items;
   creating mappings of complementary content items with contexts by associating one or more unique audio identifiers with one or more complementary content items; and
   storing the mappings in one or more catalogues enabling a look-up search for matching complementary content.

4. The method of claim 1, wherein executing further comprises:
   searching the one or more catalogues for identifying at least one complementary content item based on the determined context;
   determining a matching complementary content item;

requesting the matching complementary content item and sending the requested complementary content item to the mobile device for rendering to the user.

5. The method of claim 4, further comprising receiving the matched complementary content on the mobile device and rendering the received complementary content, wherein the complementary content is rendered in parallel to the rendering of the currently being rendered content such that the complementary content is dynamically synchronized to the currently rendered content.

6. The method of any of claim 1, wherein further the audio signal is a high frequency acoustic noise transmitted by a speaker of the audio emitter.

7. The method of any of claim 1, wherein determining a context additionally takes into account a weighted consideration of at least one of a characteristic of a content currently being rendered on the mobile device, information retrieved from the user's profile, information retrieved from a vendor's profile, a current day and/or time.

8. The method of claim 7, wherein the determining of a context is computed on the mobile device and the data comprised in and compiled with the user's profile is kept on the mobile device without being sent to device-external data storage.

9. The method of claim 1, wherein a complementary content item may be a visual content, an image, a movie, a video, and/or application functionality to be rendered at the user device.

10. The method of claim 1, wherein a complementary content item is provided as application functionality, the complementary content item being transmitted to the device and rendered on the device to enable the user to engage in interactive activities, the interactive activities being at least one of voting, commenting, buying, and/or recording a personal message and sending the personal message to a vendor.

11. The method of claim 10, wherein the user's activity on the transmitted application functionality is tracked and stored as a user's historic activity profile, wherein the user's historic activity profile is a part of the data being stored in the user's profile on the mobile device.

12. The method of claim 1, wherein determining the context further comprises acoustically triangulating the position of the mobile device and/or executing further comprises the mobile device performing as an audio emitter broadcasting back at least one encoded and modulated high frequency signal to at least one audio emitter, wherein performing as an audio emitter is based on employing the mobile device's signal tone capabilities to convey a watermarked audio signal as a modulated sound signal.

13. A computer-readable medium having stored thereon computer-readable instructions that, when run on a computer, are configured for performing the steps of the method of claim 1.

14. A computer-implemented system for dynamically synchronizing complementary content with a context of a mobile device based on broadcasting an audio signal with unique audio identifiers, the system comprising non-transitory computer-readable medium storing instructions that, when run on a computer:

provides a plurality of unique audio identifiers, each identifier associated with one or more complementary content items which are mapped to at least one pre-defined context, wherein the context dynamically characterizes the context of a situation and/or location of the mobile device;

provides a plurality of triggering commands, wherein at least one of the plurality of triggering commands is associated with at least one of the unique audio identifiers;

encodes the at least one triggering command together with the at least one associated unique audio identifier into a digital signal, wherein the at least one triggering command may be encoded together with different unique audio identifiers, and applying modulation schemes to generate a high-frequency audio signal to be broadcasted by an audio emitter;

receives, on a mobile device, the broadcasted audio signal, wherein the broadcasted audio signal is played back as a single standalone audio signal;

determines, on a mobile device, in response to the receiving the context associated with the at least one unique audio identifier based on decoding the received signal and dynamically recognizing the at least unique audio identifier in the currently broadcasted audio signal; and executes, on a mobile device, the at least one triggering command as recognized from the decoded signal.

* * * * *